United States Patent
Wakita

(10) Patent No.: US 8,110,952 B2
(45) Date of Patent: Feb. 7, 2012

(54) ROTATING ELECTRIC MACHINE HAVING GUIDE OR OUTLETS FOR SPLITTING REFRIGERANT

(75) Inventor: Tetsuo Wakita, Kariya (JP)

(73) Assignees: Toyota Jidosha Kabushiki Kaisha, Toyota-Shi (JP); Aisin Seiki Kabushiki Kaisha, Kariya-Shi (JP)

( * ) Notice: Subject to any disclaimer, the term of this patent is extended or adjusted under 35 U.S.C. 154(b) by 107 days.

(21) Appl. No.: 12/538,908

(22) Filed: Aug. 11, 2009

(65) Prior Publication Data
US 2010/0033040 A1 Feb. 11, 2010

(30) Foreign Application Priority Data
Aug. 11, 2008 (JP) ................. 2008-206869

(51) Int. Cl.
*H02K 9/28* (2006.01)
*H02K 9/00* (2006.01)
*H02K 11/00* (2006.01)
*H02K 11/02* (2006.01)
*H02K 11/04* (2006.01)

(52) U.S. Cl. ............. 310/54; 310/52; 310/53; 310/58; 310/59; 310/60 R; 310/60 A; 310/64

(58) Field of Classification Search ............ 310/52–54, 310/58, 59, 60 R, 60 A, 64; *H02K 9/19, H02K 9/00, 9/28, 11/00, 11/02, 11/03, 11/04, H02K 11/01*
See application file for complete search history.

(56) References Cited

U.S. PATENT DOCUMENTS

| | | | | |
|---|---|---|---|---|
| 5,787,729 A | * | 8/1998 | Wijaya | 62/503 |
| 7,839,031 B2 | * | 11/2010 | Tilton et al. | 310/54 |
| 2003/0102728 A1 | * | 6/2003 | Chen et al. | 310/52 |
| 2007/0278869 A1 | * | 12/2007 | Taketsuna | 310/54 |
| 2010/0013330 A1 | * | 1/2010 | Rodriguez Rodriguez et al. | 310/54 |
| 2010/0244594 A1 | * | 9/2010 | Murakami et al. | 310/54 |

FOREIGN PATENT DOCUMENTS

| | | | |
|---|---|---|---|
| JP | 62-132660 | | 8/1987 |
| JP | 2004180376 | * | 6/2004 |
| JP | 2004180376 A | | 6/2004 |
| JP | 2004357458 A | | 12/2004 |
| JP | 2005086882 A | | 3/2005 |
| JP | 2005229672 A | | 8/2005 |
| JP | 2006187105 A | | 7/2006 |
| JP | 2008022679 | * | 1/2008 |
| JP | 2008022679 A | | 1/2008 |
| JP | 2008029127 | * | 2/2008 |
| JP | 2008029127 A | | 2/2008 |
| JP | 2008178243 | * | 7/2008 |
| JP | 2008178243 A | | 7/2008 |

* cited by examiner

*Primary Examiner* — Quyen Leung
*Assistant Examiner* — Terrance Kenerly
(74) *Attorney, Agent, or Firm* — Gifford, Krass, Sprinkle, Anderson & Citkowski, P.C.

(57) ABSTRACT

To provide a rotating electric machine capable of accurate detection of coil temperature by causing refrigerant to flow so as not to contact a temperature detecting element provided on a coil end portion. A rotating electric machine (10) comprises: a cylindrical stator core (12); coils (16) wound around a plurality of teeth (14) projecting from an inner circumferential surface of the stator core (12) and having coil end portions (18) protruding beyond respective end portions in an axial direction of the stator core (12); a cooling part (50) to cool the coil (16) by dropping refrigerant onto the coil end portions (18); and a temperature detecting element (30) placed in contact with the coil end portion (18), for detecting coil temperature. The temperature detecting element (30) is provided so as not to directly contact the refrigerant flowing on the coil end portion.

6 Claims, 6 Drawing Sheets

ROTATING ELECTRIC MACHINE HAVING GUIDE OR OUTLETS FOR SPLITTING REFRIGERANT

RELATED APPLICATION

This application claims priority to Japanese Patent Application No. 2008-206869, filed on Aug. 11, 2008, the entire content of which is incorporated herein by reference.

TECHNICAL FIELD

The present invention relates to a rotating electric machine, and in particular to a rotating electric machine having a function for applying refrigerant to a coil end portion to thereby cool the coils.

BACKGROUND ART

Conventionally, a rotating electric machine or a motor is used as a power source of a hybrid car, a pure electric vehicle, and so forth. A motor comprises a cylindrical stator core, coils wound around a plurality of teeth projecting inward in the diameter direction from the inner circumferential surface of the stator core, and a rotor rotatably held within the stator and having permanent magnets provided on, or in the vicinity of, the external circumferential surface thereof. With electricity fed to the coils, a magnetic field formed within the stator varies or shifts in the circumferential direction, whereby the rotor is driven to rotate.

With the above described motor activated, a current flows in the coils, which generates heat. This heat is transmitted from the teeth to the stator, causing iron loss, or the like. Further, an excessive current may flow temporarily or continuously into the coils, depending on the state of operation of the motor. This may possibly cause abnormal increase of temperature and damage the coils. Therefore, a motor usually has a temperature sensor, such as a thermistor, or the like, for detecting coil temperature, provided on a coil end portion so that a motor current is controlled, based on the coil temperature detected by the temperature sensor, to suppress iron loss and/or to prevent coil from suffering heat damage. Further, as disclosed in Japanese Patent Laid-open Publication No. 2005-86882, there is available a motor which actively cools the coil using refrigerant, such as hydraulic oil, or the like, to suppress increase of coil temperature to thereby prevent excessive heating of the rotating electric machine.

In an arrangement, like the motor disclosed in the above described Japanese Patent Laid-open Publication No. 2005-86882, in which a thermistor is provided in contact with a coil end portion to detect coil temperature, a flat thermistor contacts the wires of the coil substantially on line areas, that is, only on a small area. Therefore, if hydraulic oil as the refrigerant should flow on the surface of the thermistor, the temperature to be detected by the thermistor is significantly affected by the hydraulic oil, which is lower in temperature than the coil. As a result, coil temperature may not be accurately detected.

SUMMARY OF THE INVENTION

According to one aspect of the present invention, there is provided a rotating electric machine comprising: a cylindrical stator core; coils wound around a plurality of teeth projecting from an inner circumferential surface of the stator core and having coil end portions protruding beyond respective end portions in an axial direction of the stator core; a cooling part for cooling the coil by dropping refrigerant onto the coil end portions; and a temperature detecting element placed in contact with the coil end portion, for detecting coil temperature, wherein the temperature detecting element is provided so as to stay away from the refrigerant flowing on the coil end portion.

In the rotating electric machine according to the present invention, the cooling part may include a refrigerant path defined between the stator core and a case member placed on an external circumferential surface of the stator core, for causing the refrigerant fed from outside into the case member to flow toward the respective coil end portions, and a guide member for splitting the refrigerant having flowed through the refrigerant path into a first refrigerant flow and a second refrigerant flow to cause the first refrigerant flow and the second refrigerant flow to drop toward the coil end portion, and the temperature detecting element may be placed on the coil end portion at a position corresponding to between the first refrigerant flow and the second refrigerant flow dropping from the guide member toward the coil end portion.

In the rotating electric machine according to the present invention, when the stator core is placed such that an axial direction thereof extends in a horizontal direction, the coil end portion may be arranged so as to present a ring-like shape having a center corresponding to the axial direction, the guide member may be positioned above the coil end portion, and the temperature detecting element may be positioned in an uppermost portion of the coil end portion or in a vicinity thereof.

In the rotating electric machine according to the present invention, the temperature detecting element may be covered by a heatproof heat insulating member, except for a portion thereof for connection to the coil end portion.

In the rotating electric machine according to the present invention, as a temperature detecting element for detecting coil temperature is provided so as not to directly contact the refrigerant flowing on the coil end portion, it is possible to accurately detect the coil temperature, using the temperature detecting element, without being affected by the refrigerant temperature.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE EMBODIMENTS

In the following, embodiments of the present invention will be described in detail with reference to the accompanying drawings. In the following description, specific shapes, materials, numeric values, directions, and the like are mere examples to help understanding of the present invention, and can be desirably changed in accordance with its use, purpose, specifications, and so forth.

Figure 1:
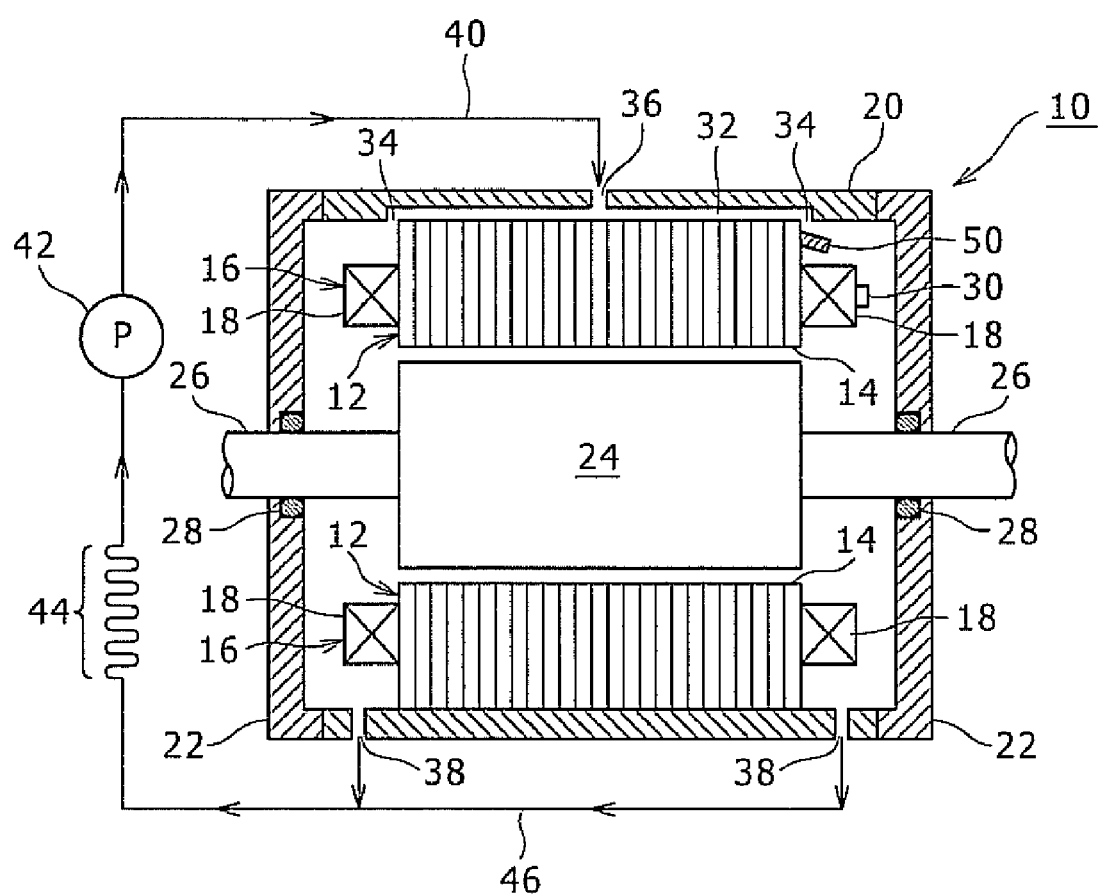
FIG. 1 is a cross sectional view of a rotating electric machine according to one embodiment of the present invention, including a partial side surface thereof.

FIG. 1 is a cross sectional view of a rotating electric machine according to one embodiment of the present invention, including a partial side surface thereof. The rotating electric machine 10 has a substantially cylindrical stator core 12. The stator core 12 can be formed by stacking many electromagnetic steel plates. The stator core 12 has a plurality of teeth 14 projecting inward in the diameter direction from the inner circumferential surface thereof. A coil 16 formed by winding a wire, such as an enameled wire, or the like, is wound around each of the teeth 14, respectively. Each of the coils 16 includes portions 18 projecting outward beyond the respective ends portions in the axial direction of the stator core 12. This portion is referred to as a coil end portion.

Figure 3:
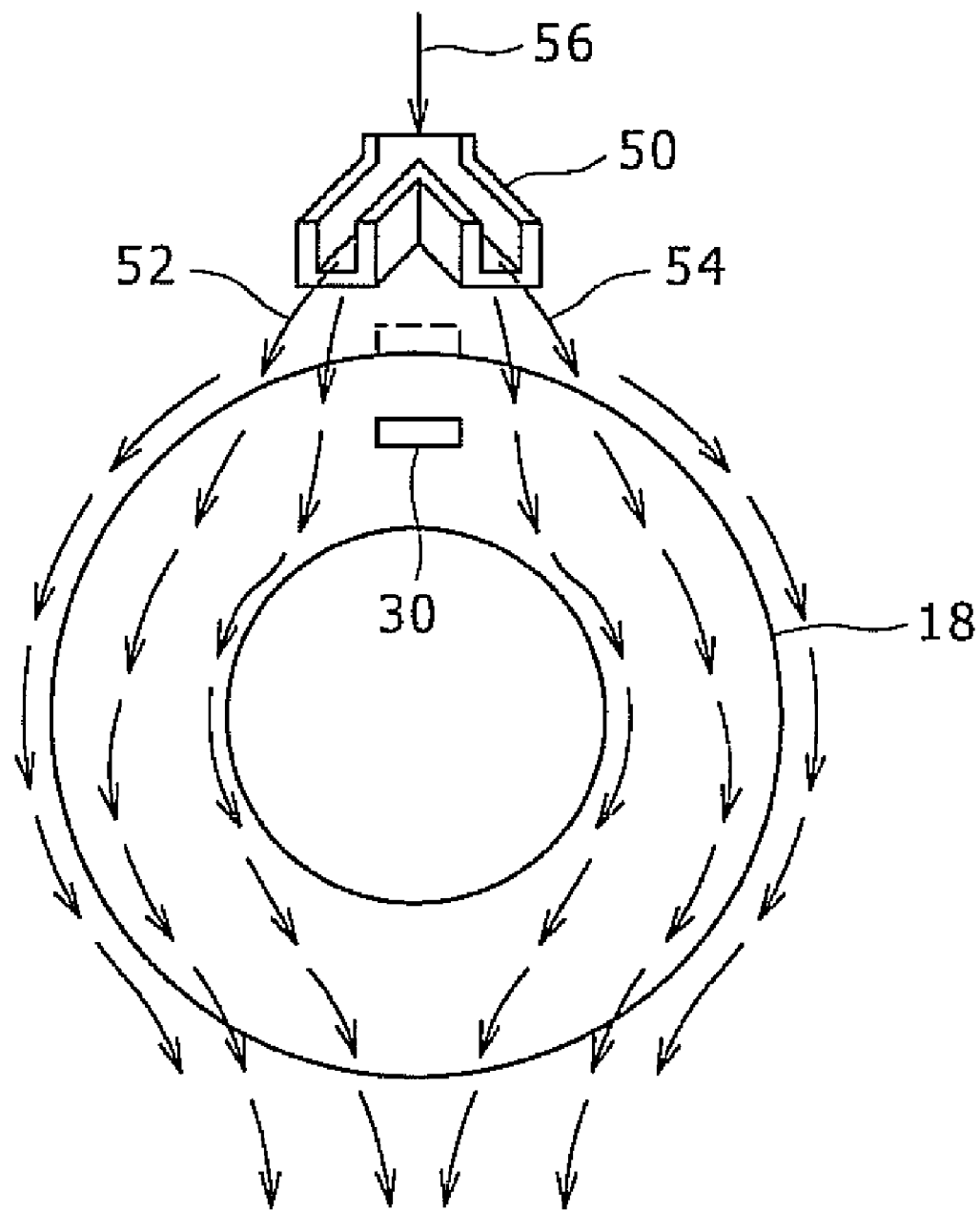
FIG. 3 is a diagram schematically showing oil dropping from the guide member and flowing down on a coil end portion.

The coil end portions 18 of the coils 16 are arranged so that they present a substantially ring-like shape which is co-axial with the stator core 12 when the rotating electric machine 10 is placed such that the axial direction of the stator core 12 extends in the horizontal direction (see FIG. 3). It should be noted that the expression "substantially" ring-like shape here is intended to include a case in which, for a rotating electric machine 10 being, e.g., a three phase AC motor, a space or an insulator to insulating the adjacent coils each other is provided between the coil end portions 18 of respective adjacent U-phase, V-phase, and W-phase coils.

A cylindrical case member 20 of which both end portions are open is placed in contact with the external circumferential surface of the stator core 12. The case member 20 is made of highly heat transmissive metal material, and functions as an accommodation member for accommodating the stator core 12 and a rotor to be described later, and also as a heat discharging member for discharging the heat transmitted from the stator core 12 to the outside.

The openings on the both end portions in the axial direction of the case member 20 are each closed by a cover member 22 which is attached to the case member 20, using a method such as bolting or the like. The cover member 22 as well is preferably made of highly heat transmissive metal material, similar to the case member 20.

A column-like rotator or a rotor 24 is mounted within the stator core 12. The rotor 24 is held by a rotation shaft 26 so as to rotate while keeping a predetermined space with respect to the teeth 14 of the stator core 12, the rotation shaft 26 extending in the axial direction of the rotor 24 so as to penetrate the center of the rotor 24. The rotation shaft 26 protrudes outside the rotating electric machine 10 via respective bearing members or bearings 28 built in the cover member 22, though one end portion of the rotation shaft 26 may be terminated where the rotation shaft 26 is rotatably held by the bearing member 28 of the cover member 22 without protruding outside the rotating electric machine 10. It should be noted that the rotor 24 and the rotation shaft 26 are shown as being viewed from the lateral side thereof in FIG. 1.

The rotor 24 includes a plurality of permanent magnets (not shown) placed in the circumferential direction at regular intervals on the external circumferential surface thereof or at inside positions near the external circumferential surface thereof. With the rotor 24 having these magnets, a magnetic field formed in the stator core 12 varies or shifts in the circumferential direction when electricity is applied to the coils 16 by applying voltage from an external power supply, whereby the rotor 24 is driven for rotation.

A temperature sensor, e.g., a thermistor 30, which is a temperature detecting element for detecting coil temperature, is provided in contact with one coil end portion 18 in the axial direction. The thermistor 30 is provided on an end surface in the axial direction of the coil end portion 18 at a position in the vicinity of the uppermost portion of the coil end portion 18 when the rotating electric machine 10 is placed such that the axial direction of the stator core 12 extends in the horizontal direction, as shown in FIG. 1.

A refrigerant path 32 constituting a part of a cooling part for the coils 16 is provided on an upper or uppermost portion of the rotating electric machine 10 shown in FIG. 1 between the stator core 12 and the case member 20. Specifically, the refrigerant path 32 is a groove formed on the inner circumferential surface of the case member 20 so as to extend in the axial direction. Being closed in the lower part thereof by the external circumferential surface of the stator core 12, the groove is formed as a flow path. The refrigerant path 32 is formed slightly longer than the stator core 12 so that the two ends in the axial direction thereof, not closed by the stator core 12, constitute refrigerant outlets 34.

It should be noted that although a groove is formed on the case member 20 to form a refrigerant path in this embodiment, this is not an exclusive example, and a groove may be formed on an upper portion of the external circumferential surface of the stator core 12 to form a refrigerant path.

At the middle position in the axial direction on the upper portion of the case member 20, a refrigerant inlet 36 which communicates with the refrigerant path 32 is formed. Further, refrigerant drain outlets 38 for draining the refrigerant pooled in a lower part of the rotating electric machine 10 are formed on the lower portion of the case member 20 at positions close to both end portions in the axial direction of the case member 20.

The refrigerant inlet 36 formed on the case member 20 is connected via a feeding path or pipe 40 to the pump 42, and the refrigerant drain outlet 38 formed on the case member 20 is connected through a drain path or pipe 46 passing through a heat discharge unit 44, such as a fin, a radiator, or the like, to the pump 42. With the above, the refrigerant is circularly fed to the rotating electric machine 10 through operation of the pump 42. Cooling oil having a smoothing function (hereinafter simply referred to as "oil") is preferably used as refrigerant for the rotating electric machine 10 in this embodiment.

A guide member (guide portion) 50, constituting a part of the cooling part, is secured on the end surface of the stator core 12, the end surface being located on the side where the temperature sensor 30 is provided. The guide member 50 is provided slightly inclining downward at a position corresponding to the refrigerant outlet 34 of the refrigerant path 32. The slight downward inclination makes it possible to cause even a small amount of refrigerant that has via the refrigerant outlet 34 to drop smoothly toward the coil end portion 18.

Figure 2:
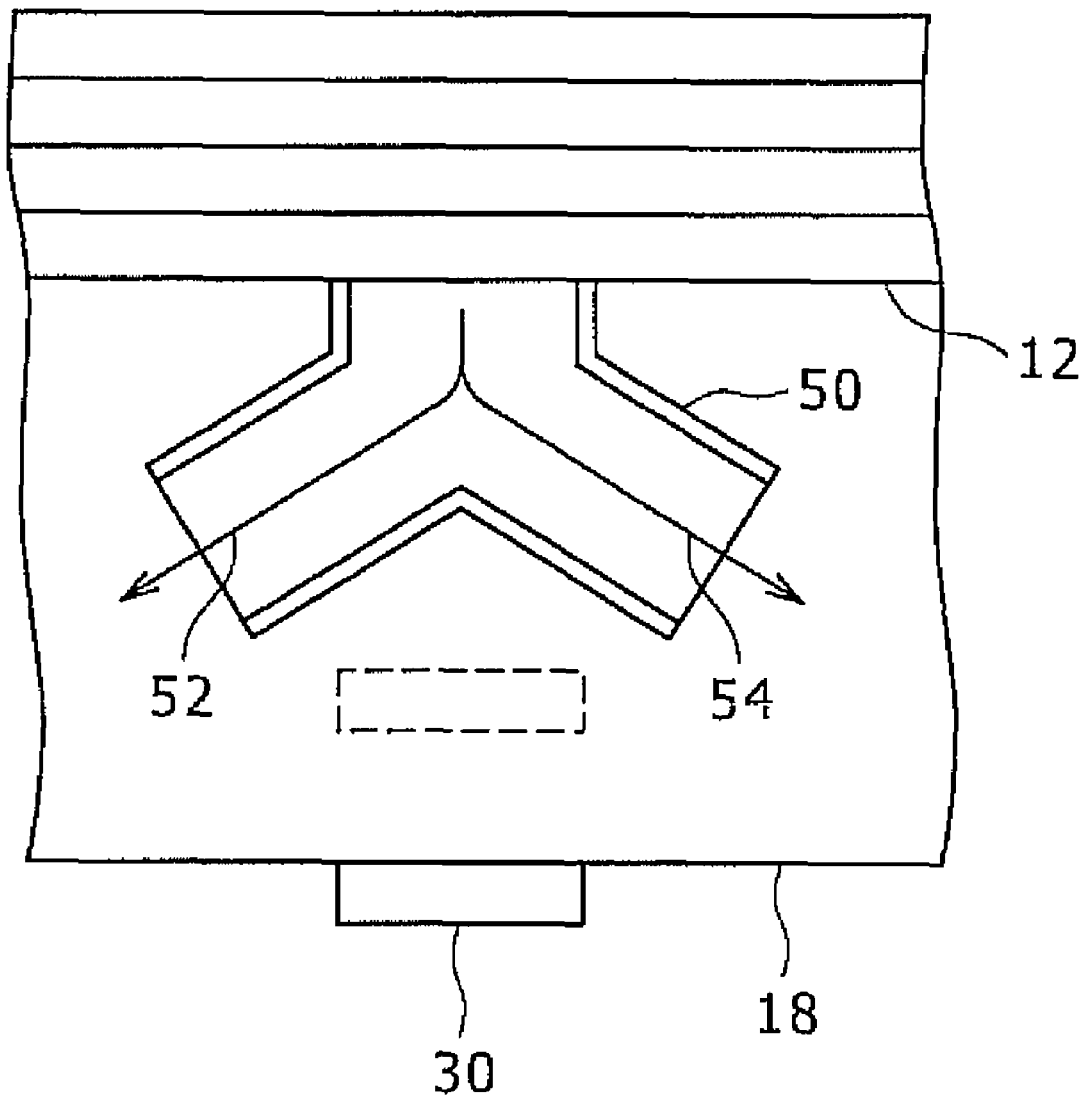
FIG. 2 is an enlarged top view of a guide member shown in FIG. 1.

FIG. 2 is a partial enlarged top view of the guide member 50. The guide member 50 is like a gutter having a substantially Y-shaped top view and a substantially C-shaped cross section, and has a function for splitting the flow of oil having flowed along the refrigerant path 32 and drained via the refrigerant outlet 34 into a first refrigerant flow 52 and a second refrigerant flow 54 to cause the flows to drop toward the coil end portion 18. As shown in FIG. 2, the temperature sensor 30 is located on the coil end portion 18 at a position corresponding to between the first refrigerant flow 52 and the second refrigerant flow 54 dropping from the guide member 50 toward the coil end portion 18.

A cooling operation of the coil end portion 18 in the rotating electric machine 10 having the above described structure will be described in the following, referring to FIG. 3.

In the rotating electric machine 10, with electricity applied to the coil 16 by applying voltage thereto from an external power supply, a magnetic field formed within the stator core 12 varies or shifts in the circumferential direction, whereby the rotor 24 is driven for rotation. At this time, flowing current in the coil 16 causes heat, which increases coil temperature. The temperature sensor 30 detects coil temperature, and based on the detected temperature, a control device (not shown) controls the coil current so that the coil temperature does not exceed a predetermined upper limit.

When the rotating electric machine 10 is driven in the power running state, the above described control device activates the pump 42, when necessary, to circularly feed oil to the rotating electric machine 10. The oil passing through the feed path 40 and fed via the refrigerant inlet 36 through operation of the pump 42 flows toward the respective ends in the axial direction of the refrigerant path 32 and then drops via the refrigerant outlets 34 toward the respective coil end portions 18.

On the coil end portion 18 without the temperature sensor 30, the oil flowing via the refrigerant outlet 34 drops onto the uppermost portion of the external circumferential surface of the substantially ring-like coil end portion 18. Thereafter, some of the oil flows along the external circumferential surface toward the respective sides of the coil end portion 18; some flows along the end surface in the axial direction of the coil end portion 18; and some flows in narrow spaces between the wires constituting the coil end portion 18. With the oil flowing from upper to lower portions of the coil end portion 18, as described above, the coil end portion 18 and a portion of the coil 16 within the stator core 12 are cooled.

The oil dropping from the coil end portion 18 and pooled in the lower part of the rotating electric machine 10 is drained via the refrigerant drain outlets 38 and fed back through the drain path 46 to the pump 42. The oil being fed back passes through the heat discharging unit 44, where heat is discharged, and the oil temperature accordingly decreases. As such, preferable cooling efficiency can be maintained.

On the coil end portion 18 with the temperature sensor 30 provided, on the other hand, the oil flowing via the refrigerant outlet 34 is split by the guide member 50 into the first refrigerant flow 52 and the second refrigerant flow 54, as shown in FIG. 3, and then drops onto the respective sides of the coil end portion 18 with the uppermost portion of the external circumferential surface of the coil end portion 18 in-between. Thereafter, some of the oil flows along the external circumferential surface toward the respective sides of the coil end portion 18; some flows along the end surface in the axial direction of the coil end portion 18; and some flows in narrow spaces between the wires constituting the coil end portion 18. In this case, the oil does not fall on or contact the temperature sensor 30 located on the coil end portion 18 at a position corresponding to between the first refrigerant flow 52 and the second refrigerant flow 54 dropping from the guide member 50 to the coil end portion 18, as described above. Therefore, the temperature sensor 30 can accurately detect the coil temperature without being affected by the oil temperature, and based on the detected temperature, the control device can perform reliable control so as to suppress the coil temperature to protect the coils 16 from heat damage.

It should be noted that although the temperature sensor 30 is provided on the end surface in the axial direction of the coil end portion 18 in this embodiment, a temperature sensor may be provided at the uppermost position of the external circumferential surface of the coil end portion 18, as indicated by the dot line shown in FIGS. 2 and 3.

Figure 4:
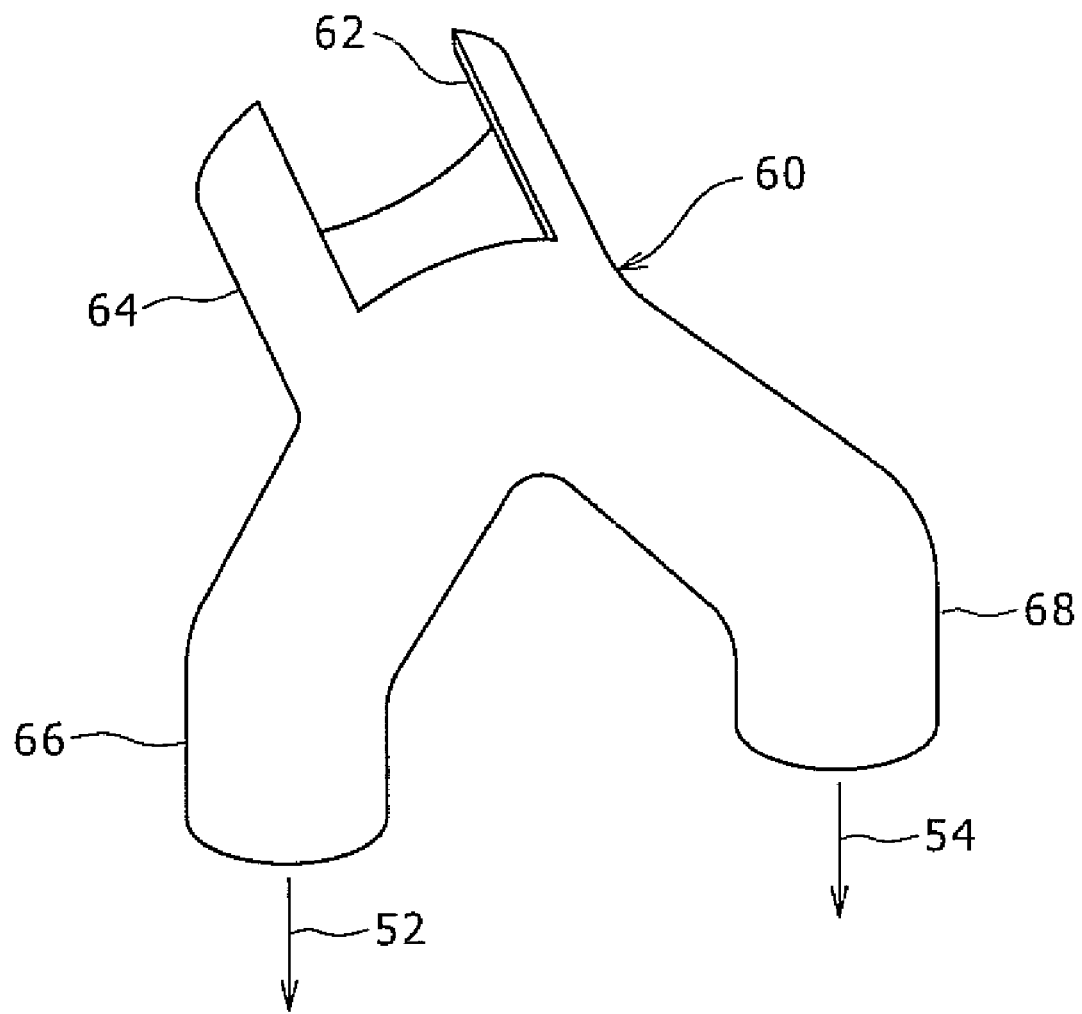
FIG. 4 is a perspective view showing a modified example of the guide member.

In the following, a modified example of the guide member for splitting the oil having flowed through the refrigerant path 32 into the first refrigerant flow 52 and the second refrigerant flow 54 will be described, with reference to FIGS. 4 and 5. Although the above described guide member 50 is formed into a gutter-like shape having an open top, a pipe or tube-like guide member 60, as shown in FIG. 4, can be used instead. The guide member 60 comprises a base end portion 64 having a rectangular cut-out 62 formed thereon to be connected to the refrigerant outlet 34 and first and second nozzles 66, 68 branched from the base end portion 64 and respectively having open ends directed downward. Use of the above described guide member 60 makes it possible to guide the first refrigerant flow 52 gushing from the first nozzle 62 and the second refrigerant flow 54 gushing from the second nozzle 64 so as to drop onto respective desired positions on the coil end portion 18 even when the oil gushes via the refrigerant outlet 34 with high pressure.

Figure 5:
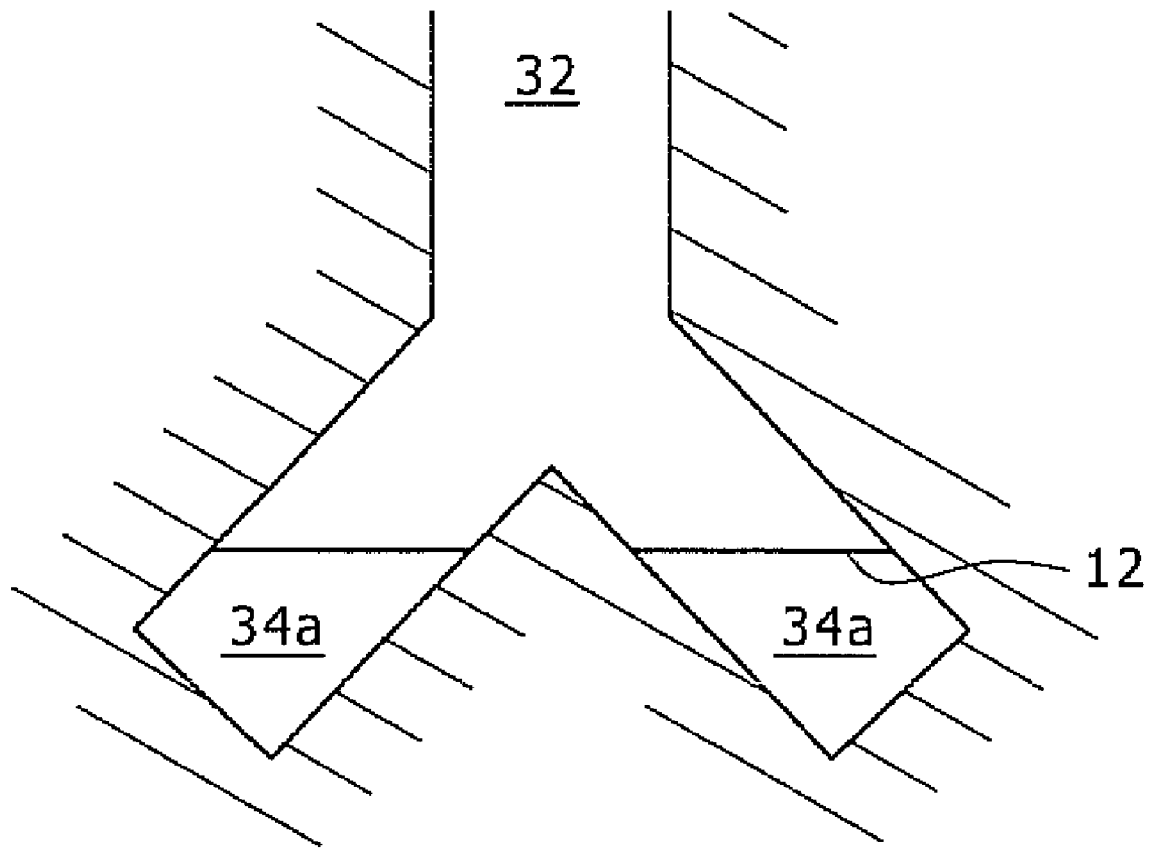
FIG. 5 is a partial cross sectional view showing an example in which an end portion of a refrigerant path is used as a guide portion of the refrigerant.

Alternatively, with omission of the guide member 50, 60, the end portion in the axial direction of the refrigerant path 32 may be split to form two refrigerant outlets 34a, 34b with a predetermined interval, as shown in FIG. 5, to form the first refrigerant flow 52 and the second refrigerant flow 54. In this case, the end portion itself of the refrigerant path 32 constitutes the guide member, producing an identical effect to that which is produced using the above described guide member 50, 60.

Next, referring to FIG. 6A and FIG. 6B, a rotating electric machine 11 according to another embodiment of the present invention will be described. Only difference from the above described rotating electric machine 10 is described here, with like elements to those of the above described rotating electric machine 10 given like reference marks and description thereof not repeated here.

Figure 6A:
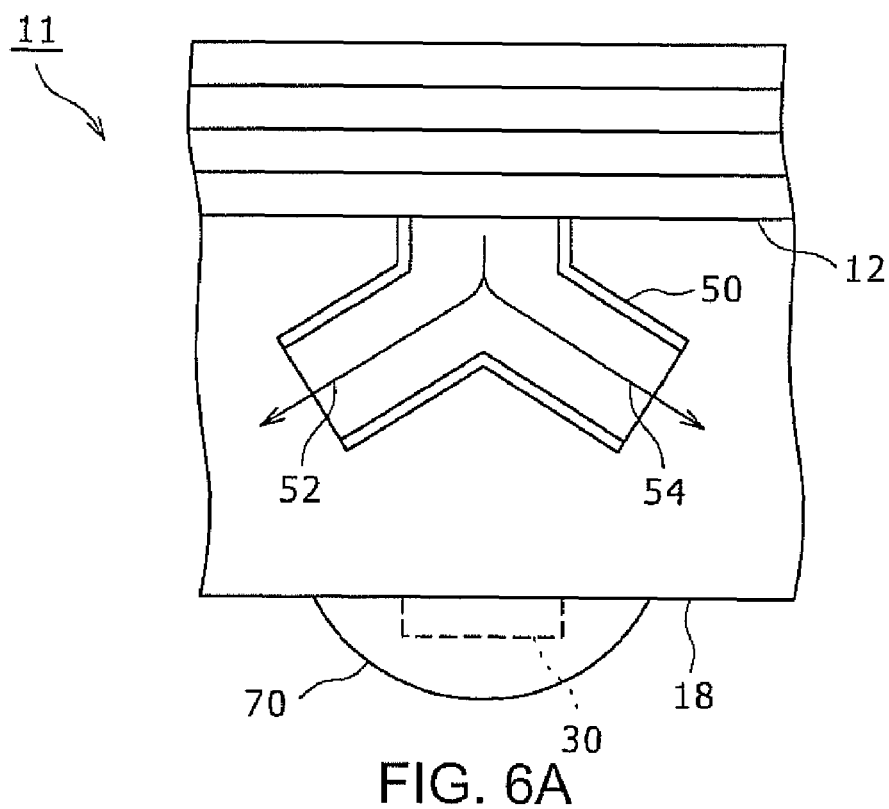
FIG. 6A and FIG. 6B are diagrams, similar to FIG. 2, showing a temperature sensor covered by a heat insulating member in a rotary electric member according to another embodiment of the present invention.
Figure 6B:
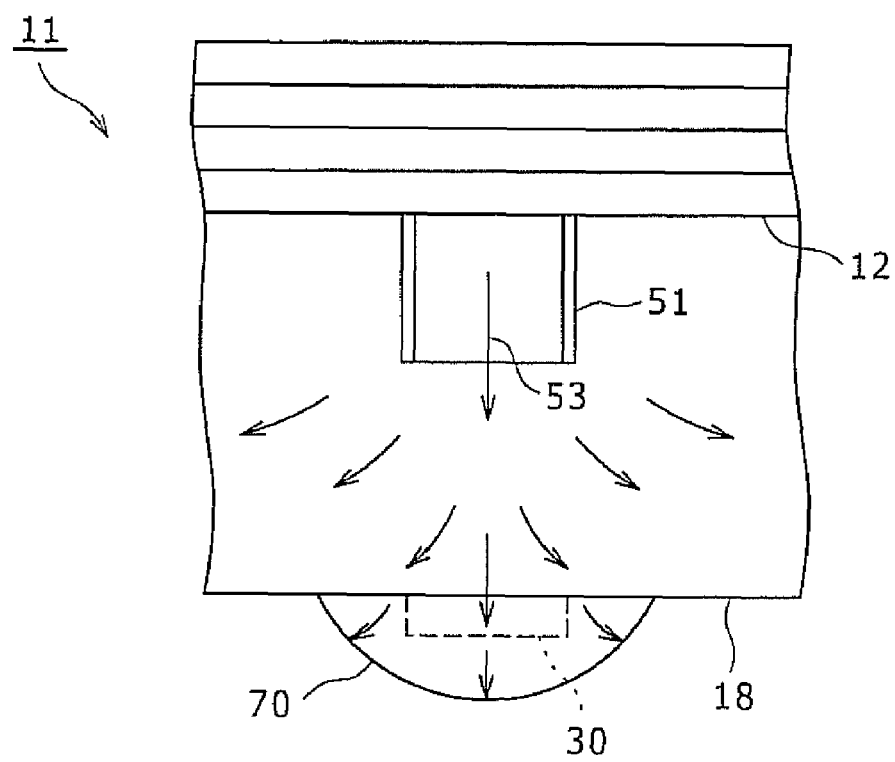

FIG. 6A is a enlarged top view of the guide member 50, similar to FIG. 2; FIG. 6B is a diagram showing an example with a guide member having a modified shape.

The rotating electric machine 11 in this embodiment differs from the above described rotating electric machine 10 only in that the temperature sensor 30 provided in contact with the end surface in the axial direction of the coil end portion 18 is covered by a heatproof heat insulating member 70. The heat insulating member 70 for use with refrigerant being oil is preferably made of oil resistive material, e.g., fluorine resin, rubber, or the like. In this configuration, the temperature sensor 30 coated with heat insulating member 70 can accurately detect coil temperature, even should the oil, namely the first refrigerant flow 52 and the second refrigerant flow 54, dropping from the guide member 50 fall on the temperature sensor 30, without being affected by the oil temperature as the oil does not directly contact the sensor surface.

In addition, for the above described temperature sensor 30 covered by the heat insulating member 70, a guttered guide member 51 for letting the oil flowing via the refrigerant outlet 34 drop onto the coil end portion 18 as a single flow of refrigerant 53 without being split, may be used. Alternatively, with omission of a guide member, the oil flowing via the refrigerant outlet 34 may be allowed to drop directly onto the uppermost portion of the external circumferential surface of the coil end portion 18. In this case, although oil will flow along the end surface in the axial direction of the coil end portion 18 and further on the heat insulating member 70, influence of the oil temperature on the temperature sensor 30 can be suppressed thanks to the heat insulating effect of the heat insulating member 70.

It should be noted that although it is described that coil temperature is detected using a single temperature sensor 30 in the above described rotating electric machine 10, 11, the present invention can be applied to a rotating electric machine which detects coil temperature, using two or more temperature sensors.

Although the present invention has been fully described by way of examples with reference to the accompanying drawings, it is to be noted that various changes and modifications will be apparent to those skilled in the art. Therefore, unless such changes and modifications depart from the spirit and the scope of the present invention, they should be construed as being included therein.

What is claimed is:

1. A rotating electric machine, comprising:
   a cylindrical stator core;
   a case member placed on an external circumferential surface of the stator core;
   coils wound around a plurality of teeth projecting from an inner circumferential surface of the stator core and having coil end portions protruding beyond respective end portions in an axial direction of the stator core;
   a cooling part to cool the coils by dropping refrigerant onto the coil end portions, the cooling part including a refrigerant path and a guide member, the refrigerant path is defined between the stator core and the case member and causes refrigerant fed from outside into the case member to flow towards the respective coil end portions, the guide member includes substantially Y-shaped channels that split the refrigerant having flowed through the refrigerant path into a first refrigerant flow and a second refrigerant flow; and
   a temperature detecting element placed in contact with the coil end portion, for detecting coil temperature,
   wherein the temperature detecting element is placed on the coil end portion at a position corresponding to between the first refrigerant flow and the second refrigerant flow that drops from the guide member toward the coil end portion.

2. The rotating electric machine according to claim 1, wherein, when the stator core is placed such that an axial direction thereof extends in a horizontal direction, the coil end portions are arranged so that they present a ring-like shape having a center corresponding to the axial direction, the guide member is positioned above the coil end portion, and the temperature detecting element is positioned in an uppermost portion of the coil end portion or in a vicinity thereof.

3. The rotating electric machine according to claim 1, wherein the temperature detecting element is covered by a heatproof heat insulating member except for a portion thereof for connection to the coil end portion.

4. A rotating electric machine comprising:
   a cylindrical stator core;
   coils would around a plurality of teeth projecting from an inner circumferential surface of the stator core and having coil end portions protruding beyond respective end portions in an axial direction of the stator core;
   a cooling part to cool the coils by dropping refrigerant onto the coil end portions; and
   a temperature detecting element placed in contact with the coil end portion, for detecting coil temperature,
   wherein the cooling part includes a refrigerant path defined between the stator core and a case member placed on an external circumferential surface of the stator core, for causing the refrigerant fed from outside into the case member to flow toward the respective coil end portions, and two refrigerant outlets for splitting the refrigerant having flowed through the refrigerant path into a first refrigerant flow and a second refrigerant flow at an end portion in the axial direction of the refrigerant path, the two refrigerant outlets being formed in the case member, to drop toward the coil end portion, and the temperature detecting element is placed on the coil end portion at a position corresponding to between the first refrigerant flow and the second refrigerant flow dropping from the two refrigerant outlets toward the coil end portion.

5. The rotating electric machine according to claim 4, wherein, when the stator core is placed such that an axial direction thereof extends in a horizontal direction, the coil end portions are arranged so that they present a ring-like shape having a center corresponding to the axial direction, the two refrigerant outlets are positioned above the coil end portion, and the temperature detecting element is positioned in an uppermost portion of the coil end portion or in a vicinity thereof.

6. The rotating electric machine according to claim 4, wherein the temperature detecting element is covered by a heatproof heat insulating member except for a portion thereof for connection to the coil end portion.

* * * * *

UNITED STATES PATENT AND TRADEMARK OFFICE
CERTIFICATE OF CORRECTION

| | | |
|---|---|---|
| PATENT NO. | : 8,110,952 B2 | Page 1 of 1 |
| APPLICATION NO. | : 12/538908 | |
| DATED | : February 7, 2012 | |
| INVENTOR(S) | : Tetsuo Wakita | |

It is certified that error appears in the above-identified patent and that said Letters Patent is hereby corrected as shown below:

At column 2, line number 23, after present, delete extra spaces.

At column 3, line number 18, delete "ends", insert --end--.

At column 3, line number 28, delete "insulating", insert --insulates--.

At column 3, line number 28, after coils, delete "each other is provided".

At column 4, line number 54, after has, insert --drained--.

At column 4, line number 65, after corresponding, delete "to".

At column 6, line number 2, delete "dot", insert --dotted--.

At column 6, line number 32, delete "only", insert --The only--.

In the claims:
At column 8, line number 9, delete "would", insert --wound--.

Signed and Sealed this
Second Day of October, 2012

David J. Kappos
*Director of the United States Patent and Trademark Office*